United States Patent
Miller et al.

[11] Patent Number: 6,052,745
[45] Date of Patent: Apr. 18, 2000

[54] SYSTEM FOR ASSERTING BURST TERMINATION SIGNAL AND BURST COMPLETE SIGNAL ONE CYCLE PRIOR TO AND DURING LAST CYCLE IN FIXED LENGTH BURST TRANSFERS

[75] Inventors: Michael Raymond Miller, Cary, N.C.; John Patrick McCardle, II, Oviedo, Fla.; Michael Patrick Muhlada, Wake Forest; Mark Michael Schaffer, Cary, both of N.C.; Christopher Randall Starr, Austin, Tex.

[73] Assignee: International Business Machines Corporation, Armonk, N.Y.

[21] Appl. No.: 09/096,943

[22] Filed: Jun. 12, 1998

[51] Int. Cl.⁷ ........................................ G06F 13/28
[52] U.S. Cl. .................. 710/35; 710/105; 710/126; 710/127; 710/129; 709/231; 365/221
[58] Field of Search .............................. 395/855; 710/35, 710/126, 127, 105

[56] References Cited

U.S. PATENT DOCUMENTS

| | | | |
|---|---|---|---|
| 4,445,176 | 4/1984 | Burk et al. | 709/231 |
| 5,029,124 | 7/1991 | Leahy et al. | 710/105 |
| 5,469,398 | 11/1995 | Scott et al. | 365/221 |
| 5,584,033 | 12/1996 | Barrett et al. | 710/105 |
| 5,596,731 | 1/1997 | Martinez, Jr. et al. | 710/129 |
| 5,640,517 | 6/1997 | Parks et al. | 710/105 |
| 5,649,125 | 7/1997 | Tietjen et al. | 710/126 |
| 5,689,659 | 11/1997 | Tietjen et al. | 710/127 |
| 5,768,622 | 6/1998 | Lory et al. | 710/35 |

*Primary Examiner*—Thomas C. Lee
*Attorney, Agent, or Firm*—John D. Flynn

[57] ABSTRACT

The present invention provides a method and system for fixed length bursts of data on a bus within a data processing system. The method and system in accordance with the present invention provides a burst transfer protocol which includes the providing of length information of a fixed length burst of data on a signal from at least one master device to at least one slave device when the at least one master device requests the fixed length burst of data. It also includes the asserting of a burst termination signal by the at least one slave device one cycle prior to a last cycle in the fixed length burst, and the asserting of a burst complete signal during the last cycle in the fixed length burst for a write burst, or one cycle prior to the last cycle in the fixed length burst for a read burst, based on the value of the signal. This burst transfer protocol enables burst transfers of a maximum length to be performed across a local bus between a master and a slave without dead cycle penalties after the transfer. This improves the efficiency and performance of data throughput across the local bus without the need to increase the frequency. The present invention requires no new signals and is optional so a master and slave who use the protocol of the present invention is compatible with masters and slaves who do not.

18 Claims, 6 Drawing Sheets

FIXED LENGTH BURST TRANSFER

SINGLE READ TRANSFER

FIG. 2

FOUR-WORD READ TRANSFER

FIG. 3

OPEN-ENDED BURST TRANSFER

FIG. 4

FIXED LENGTH BURST TRANSFER

FIG. 5

SYSTEM FOR ASSERTING BURST TERMINATION SIGNAL AND BURST COMPLETE SIGNAL ONE CYCLE PRIOR TO AND DURING LAST CYCLE IN FIXED LENGTH BURST TRANSFERS

FIELD OF THE INVENTION

The present invention relates to local bus performance in computer systems and specifically to improving data throughput across a local bus.

BACKGROUND OF THE INVENTION

Significant advances in silicon densities have allowed for the integration of many functions onto a single silicon chip. With this increased density, many of the peripherals in a computer system that were normally attached to the processor via an external bus now are attached via a local bus. In addition, the bandwidth requirements of these local buses are increasing due to the integration of various audio, video, and graphic functions along with the processor. As a result, achieving maximum local bus performance in its communications with processor cores and peripherals is a concern. This concern is particularly great when multiple devices in the computer system is linked to the same local bus.

Figure 1A:
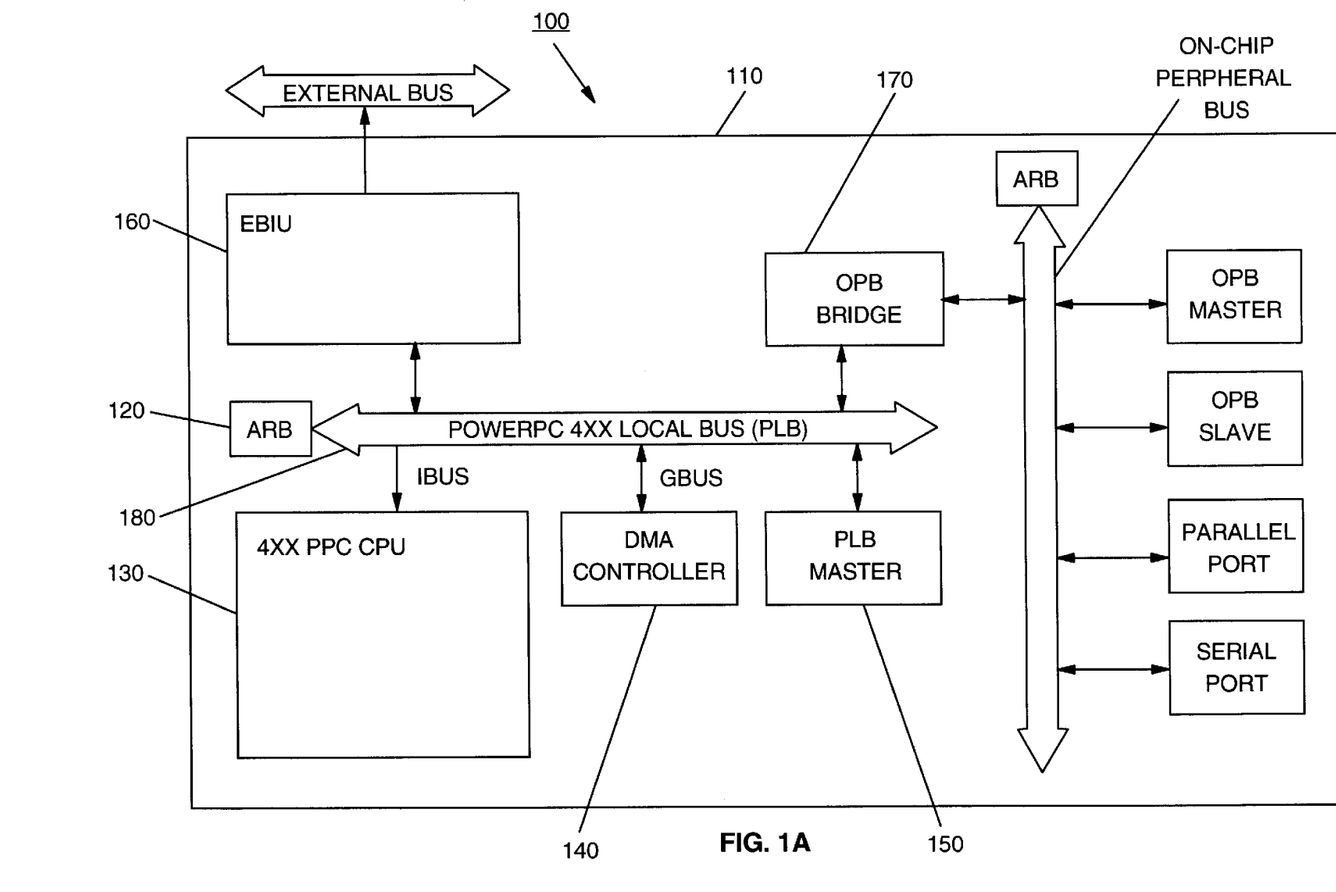
FIGS. 1A and 1B illustrate a system with a chip containing a local bus.

FIG. 1A illustrates a conventional system 100 with a chip 110 containing a local bus 120. In this particular example, the local bus is the PowerPC 4XX Local Bus or "PLB" 120. However, other types of local buses may be used. The local bus 120 supports read and write data transfers between master and slave devices equipped with a local bus interface. A "master" device is one which requests access to or control of the local bus 120 and transmits and receives data across the local bus 120. A "slave" device is one which transmits or receives data across the local bus 120 and is responsive to a master. The slave may not request access to or control of the local bus 120.

Figure 1B:
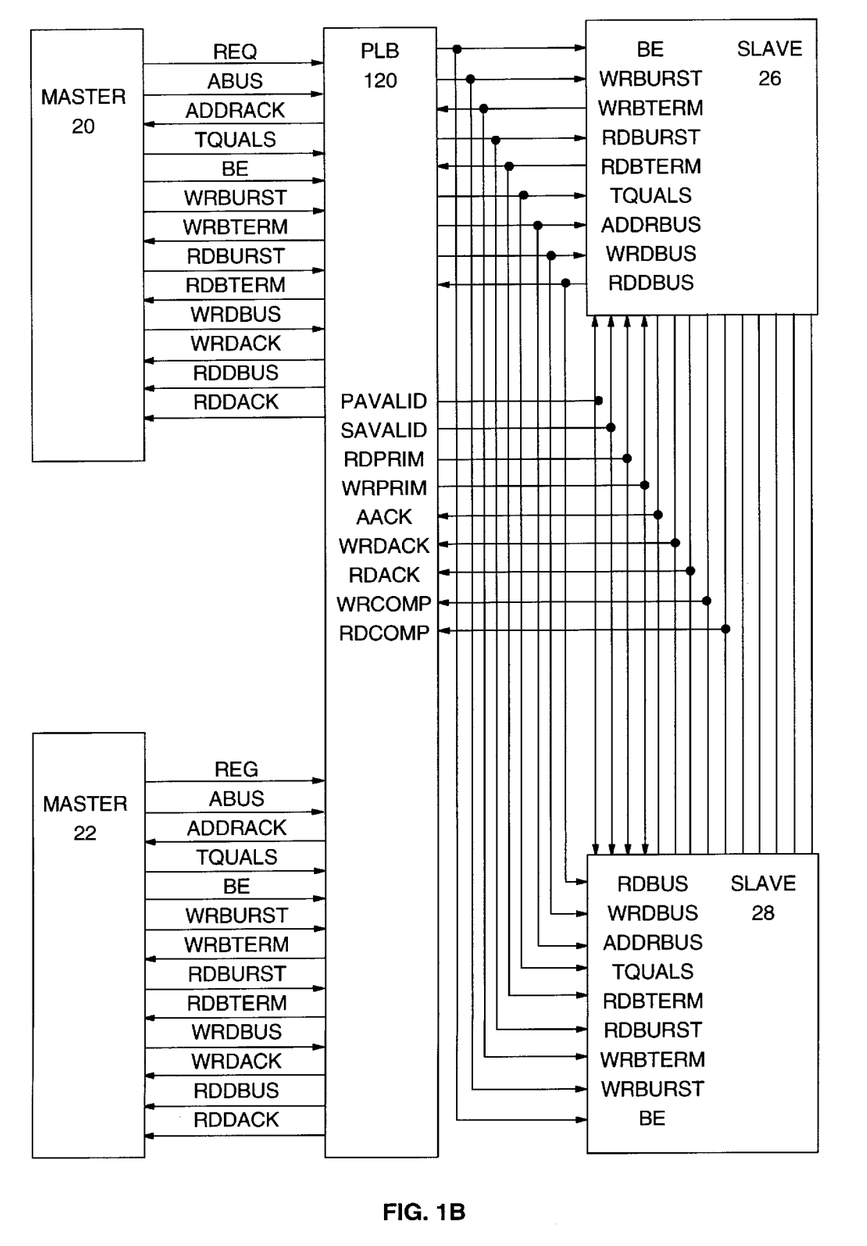

FIG. 1B illustrates in more detail the connection between master 20 and 22 and slaves 26 and 28 across the local bus 120. The masters 20, 22 could be the 4XX PowerPC Core central processing unit 130, the direct memory access controller 140, or the additional master 150 in FIG. 1A. The slaves 26, 28 could be the External Bus Interface Unit (EBIU) 160 or the On-chip Peripheral Bus (OPB) Bridge Unit 170. Access to the local bus 120 is granted through an arbitration mechanism 180 which is inside of the local bus 120 (also 180 in FIG. 1A) which allows masters to compete for bus ownership. Timing for all local bus signals is provided by a single clock source (not shown). This single clock source is shared by all masters and slaves attached to the local bus 120.

Figure 2:
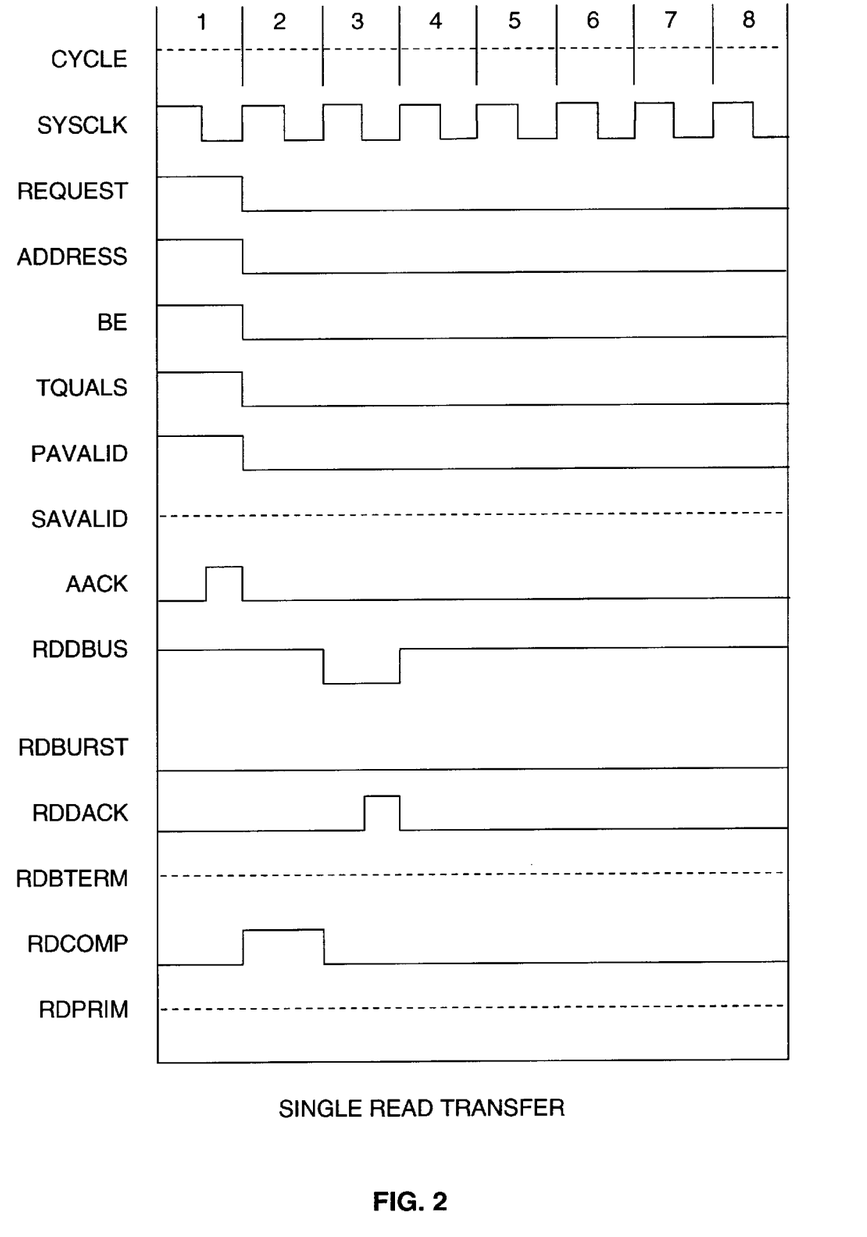
FIG. 2 is a timing diagram for a single read transfer under conventional protocols.
Figure 3:
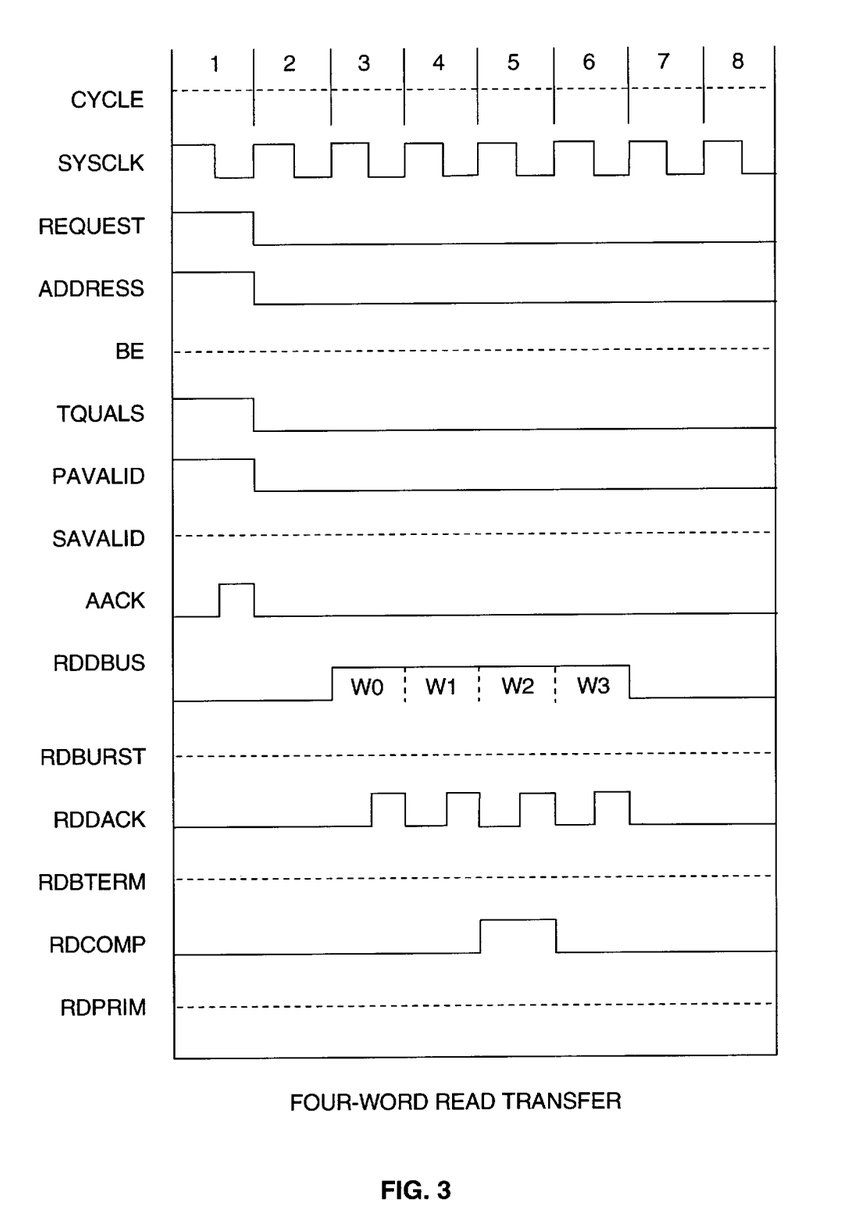
FIG. 3 is a timing diagram for a line read transfer under conventional protocols
Figure 4:
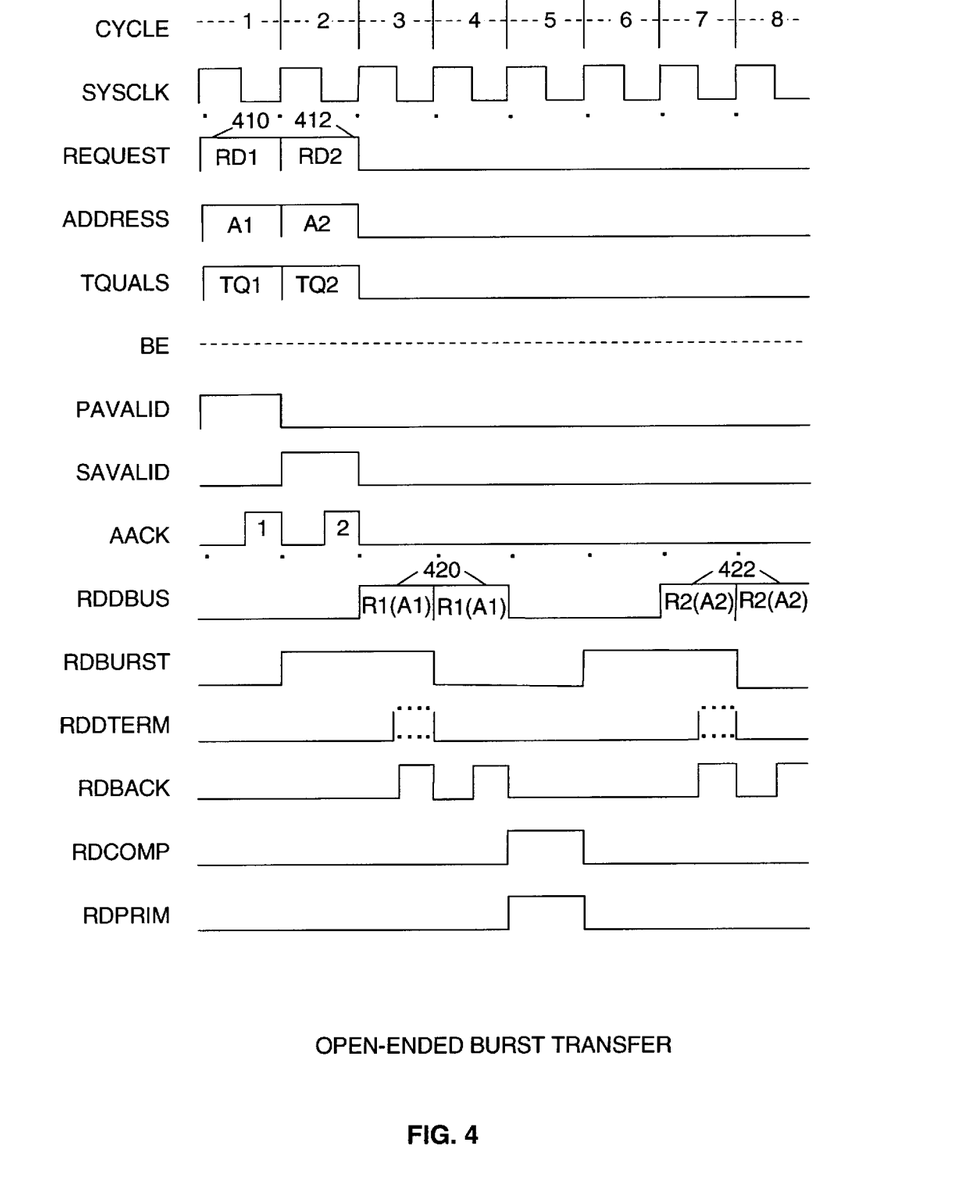
FIG. 4 is a timing diagram for a burst transfer under a conventional burst protocol.

An important factor in the performance of the system 100 is the time required to perform a data read transfer across the local bus 120 between a master and a slave. There are three types of data read transfers: a single read, a line read (of 4, 8 or 16 words), and a burst read transfer. FIGS. 2 through 4 are timing diagrams illustrating examples of these types of data read transfers. For the purpose of these examples, assume that the master for this transfer is the master 20, and the slave is the slave 26 of FIG. 1B. Table 1 below gives the definitions of the signals illustrated on FIGS. 2 through 4.

TABLE 1

SIGNAL DEFINITIONS FOR FIGS. 1B THROUGH 4

| Signal | Definition |
| --- | --- |
| SysClk | System Clock |
| Request (Bus Request) | This signal is asserted by a master to request a data transfer across the bus. |
| Address (Address Bus) | Each master is required to provide a 32-bit address when its Request signal is asserted |
| TQuals (Transfer Qualifiers) | These signals are used to indicate to the slave the direction of the transfer, size of the transfer, and the type of transfer |
| BE (Byte Enables) | These signals are used to indicate to the slave which bytes of a word should be transfered for this access. For conventional methods of burst tranfers, this is ignored. |
| PAValid (Primary Address Valid) | This signal is asserted by the arbiter to indicate to the slaves that there is a valid address for the primary data and transfer qualifiers on the bus. |
| SAValid (Secondary Address Valid) | This signal is asserted by the arbiter to indicate to the slaves that there is a valid address for the secondary data and transfer qualifiers on the bus. |
| AAck (Address Acknowledge) | This signal indicates that the slave has acknowledged the address and will latch the address and all of the transfer qualifiers at the end of the current cycle. |
| RdDBus (Read Data Bus) | This is a 32-bit data bus which is used to transfer data during read operations from the slaves to the masters. |
| WrDBus (Write Data Bus) | This is a 32-bit data bus which is used to transfer data during write operations from the masters to the slaves. |
| RdDAck (Read Data Acknowledge) | This signal is driven by the slaves and is used for all read operations to inidicate to the master that the data is valid on the read data bus and must be latched at the end of the current cycle. |
| WrDAck (Write Data Acknowledge) | This signal is driven by the slaves and is used for all write operations to indicate to the master that the data on the write data bus is being latched at the end of the current cycle and is no longer required by the slave. |
| RdComp (Data Read Complete) | This signal is driven by the slaves and is used to indicate to the arbiter 180 that either the read operation is complete is complete or will be completed in the end of the next clock cycle. |
| WrComp (Data Write Complete) | This signal is driven by the slaves and is used to indicate to the arbiter 180 that the write operation is complete |
| RdBurst (Read Burst) | This signal is driven by the masters and is used to indicate to the slave that the read burst transfer is not complete. |
| WrBurst (Write Burst) | This signal is driven by the masters and is used to indicate to the slave that the write burst transfer is not complete. |
| RdBTerm (Read Burst Terminate) | This signal is driven by the slave and is used to indicate to the master that it should drop the RdBurst signal during the next cycle and terminate the current read burst transfer. |
| WrBTerm (Write Burst Terminate) | This signal is driven by the slave and is used to indicate to the master that it should drop the WrBurst signal during the next cycle and terminate the current write burst transfer. |

FIG. 2 is a timing diagram illustrating an example single read transfer under conventional single read protocols. The master 20 asserts a request for a data transfer with a Request signal in cycle 1. Through the TQuals signal, the master 20 will indicate that the transfer will be a single read. The BE signals will indicate the number of bytes to be read. The data is then read and placed on the local bus 120 via the Read Data Bus (RdDBus) in cycle 3. In the meantime, the slave 26 will access the BE signals to receive information on the bytes to be read. The slave 26 will terminate the transfer by asserting the RdComp signal during cycle 2. Since by definition the Read Data Bus may be used by the slave in the cycle after the RdComp signal is asserted, the data is properly read and transferred in cycle 3. Another master may then obtain control of the local bus' Read Data Bus starting in cycle 4.

FIG. 3 is a timing diagram illustrating an example of a four-word line read transfer under conventional line read protocols. As with the single read, the master 20 asserts a request for a data transfer with a Request signal in cycle 1. Through the TQuals signal, the master 20 will indicate that the transfer will be a four-word line read. The BE signals are not used or are ignored by the slave in this case. In other words, the slave accesses the TQuals signal to receive information on the number of bytes to be read. The data is read and placed on the Read Data Bus (RdDBus) in cycles 3 through 6. The slave 26 then terminates the transfer by asserting the RdComp signal during cycle 5. The data transfer ends in cycle 6, completing the four-word line read transfer. Another master may then obtain control of the local bus=Read Data Bus starting in cycle 7.

FIG. 4 is a timing diagram illustrating an example burst transfer under a conventional burst protocol. A burst refers to a data access which comprises multiple data transfers Under the conventional burst protocol, burst transfers are open-ended, i.e. the maximum number of data transfers for the transfer is not known at the time of access offset by operating the system 100 at a higher frequency, this solution is not practical since other masters and slaves of the system may not operate on this higher frequency and thus its protocols would not be compatible with those of the system 100.

Accordingly, what is needed is a method and system for increasing the efficiency of data throughput across the local bus during burst transfers without the need to increase the frequency. This system should be compatible with existing system protocols. The present invention addresses such a need.

SUMMARY OF THE INVENTION

The present invention provides a method and system for fixed length bursts of data on a bus within a data processing system. The method and system in accordance with the present invention provides a burst transfer protocol which includes the providing of length information of a fixed length burst of data on a signal from at least one master device to at least one slave device when the at least one master device requests the fixed length burst of data. It also includes the asserting of a burst termination signal by the at least one slave device one cycle prior to a last cycle in the fixed length burst, and the asserting of a burst complete signal during the last cycle in the fixed length burst for a write burst or one cycle prior to the last cycle in the fixed length burst for a read burst, based on the value of the signal. This burst transfer protocol enables burst transfers of a maximum length to be performed across a local bus between a master and a slave without dead cycle penalties after the transfer. This improves the efficiency and performance of data throughput across the local bus without the need to increase the frequency. The present invention requires no new signals and is optional so a master and slave who use the protocol of the present invention is compatible with masters and slaves who do not.

DETAILED DESCRIPTION OF THE INVENTION

The present invention relates to an improvement in the efficiency of data throughput across a local bus. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention improves the efficiency of data throughput by improving the efficiency of its burst protocol. To more particularly describe the features of the present invention, please refer to FIG. 5 in conjunction with the discussion below. A preferred embodiment of a burst protocol of the present invention utilizes the BE signals which are ignored under conventional burst protocols to perform the burst transfer as a fixed length transfer, i.e., a transfer where the maximum length of the transfer is known at the time of access initiation and is transmitted to the slave via the BE signals.

Figure 5:
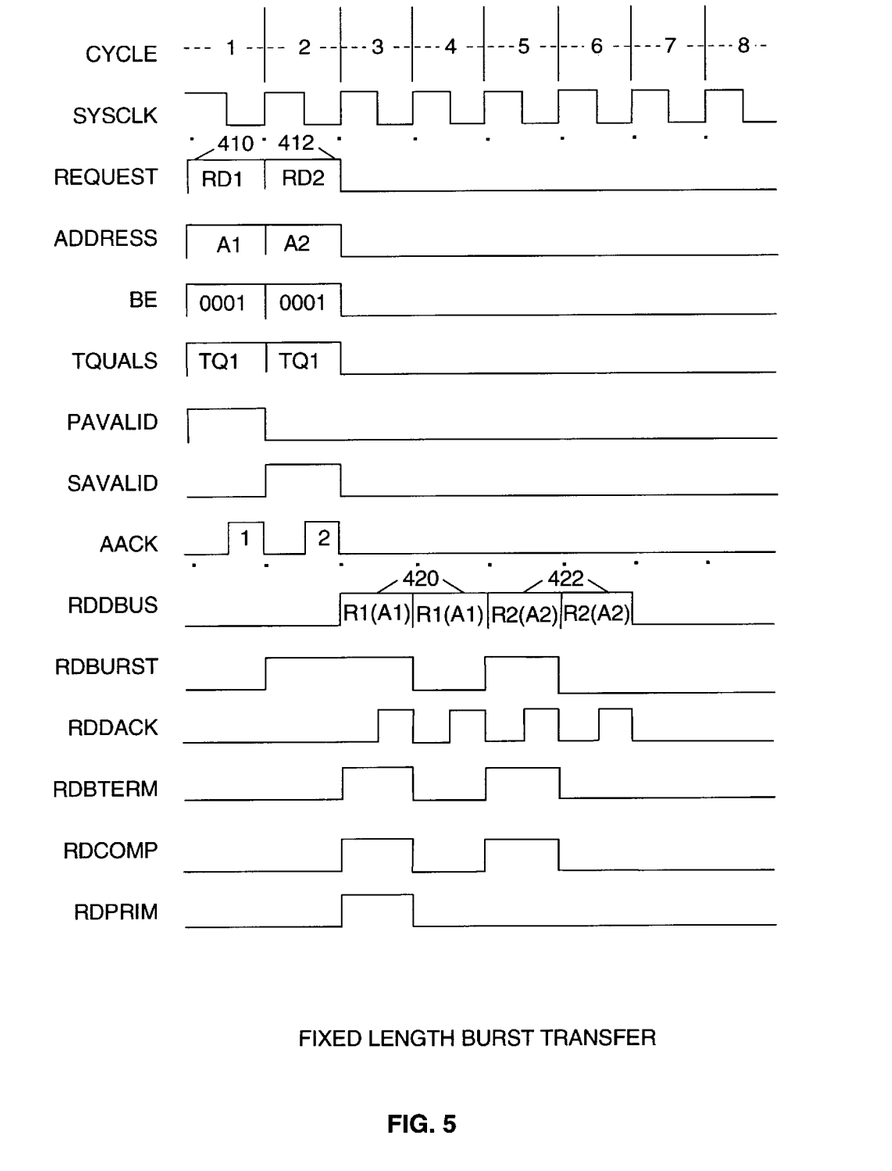
FIG. 5 is a timing diagram for a burst transfer under a burst protocol in accordance with the present invention.

In a fixed length burst transfer under the protocol of the present invention, the burst will continue either until the maximum number of transfers has been performed or until the master 20 or the slave 26 terminates the transfer, whichever occurs first. In the case where the maximum number of data transfers is performed, the slave 26 is able to assert the RdComp and RdBTerm signals at an earlier cycle than under the conventional protocol, thereby allowing a subsequent transfer to begin two cycles earlier.

FIG. 5 is a timing diagram of an example fixed length burst transfer where the maximum number of data transfers is performed under the burst protocol of the present invention. As in the transfer of FIG. 4, the master 20 asserts two requests, Rd1 (410) and Rd2 (412) in cycles 1 and 2 for two sets of data, R1 (420) and R2 (422). Again, the TQuals signal will indicate that the read will be a burst transfer. However, unlike the conventional protocol, the BE signals are coded to indicate the maximum burst length the master 20 is requesting, thus signifying a fixed-length burst transfer. The burst length refers to the number of transfers of the data type selected by the TQuals signal. For example, a code of "0001" can indicate a maximum burst length of two, "0010" to indicate a maximum burst length of three, etc. Table 2 below lists one example of codes for the BE signals under the burst protocol of the present invention.

TABLE 2

| BE Signals Code | Maximum Burst Length |
|---|---|
| 0000 | Open-ended |
| 0001 | Burst of 2 |
| 0010 | Burst of 3 |
| 0011 | Burst of 4 |
| . | . |
| . | . |
| . | . |
| 1111 | Burst of 16 |

The slave 26 can access this information and know ahead of time when the transfer will end and thus can control when to drive the RdComp signal high to end the transfer.

In the example burst transfer of FIG. 5, the BE signals contain the code "0001" for both transfers Rd1 (410) and Rd2 (412). This signifies that R1 (420) and R2 (422) will contain at most two pieces of data. The master 20 initiates the read of the first set of data R1 (420) by asserting the RdBurst signal during cycle 2. Since the slave now knows the maximum burst length, it can assert the RdBTerm and RdComp signals one cycle prior to the last data cycle which is cycle 3 in this particular example. When the slave 26 asserts the RdBTerm signal, the master 20 must respond by dropping the RdBurst signal. Since the RdBurst signal is dropped at the end of cycle 3, cycle 4 is the last read cycle of the transfer. Since the RdComp signal is asserted in cycle 3, the arbiter 180 knows that the last cycle of the transfer will be cycle 4. So in cycle 5, the arbiter 180 will allow other masters to obtain ownership of the local read data bus. The read of the second set of data R2 can thus begin immediately in cycle 5. This protocol eliminates the two dead cycle penalty after open-ended burst transfers under the conventional protocol.

Under the fixed length burst protocol of the present invention, the communicating of burst length information to the slave 26 through the BE signals are optional. A burst transfer can still be performed as an open-ended transfer, with the master 20 prompting the termination of the transfer. This is accomplished by coding the BE signals with "0000". Also, with any BE signal, both the master 20 and the slave 26 maintain the option to terminate the burst transfer prior to completion of the full burst. In either case, the master 20 must continue to assert the RdBurst signal until it wants to terminate the burst or until the slave asserts the RdBTerm signal. This allows slaves who do not have a protocol which recognizes the codes in the BE signals in burst transfers to be compatible with masters who do, and vice versa.

Although the present invention has been described in the context of a burst read, one of ordinary skill in the art will understand that similar benefits may be provided to a burst write by asserting a write burst termination (WrBTerm) signal (see FIG. 1B and Table 1) one cycle prior to the last cycle of the burst write and a write burst complete (WrComp) signal during the last cycle of the write burst, without departing from the spirit and scope of the present invention.

Although the present invention has been described with the maximum burst length communicated to the slave via the BE signals, one of ordinary skill in the art will understand that any signal in a bus structure may be used without departing from the spirit and scope of the present invention.

Although the present invention has been described in the context of a PowerPC 4XX Local Bus, one of ordinary skill in the art will understand that other types of buses may be used with the burst protocol of the present invention without departing from the spirit and scope of the present invention.

A method and system for a fixed length burst transfer has been disclosed. The burst transfer protocol of the present invention enables burst transfers of a maximum length to be performed across a local bus between a master and a slave without dead cycle penalties after the transfer. This improves the efficiency and performance of data throughput across the local bus without the need to increase the frequency. The present invention requires no new signals and is optional so a master and slave who use the protocol of the present invention is compatible with masters and slaves who do not.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing fixed length burst of data on a bus within a data processing system; the data processing system including a plurality of master devices coupled to the bus; and a plurality of slave devices coupled to the bus; the method comprising the steps of:

(a) providing a maximum length information of a fixed length burst of data on a signal from at least one master device to at least one slave device when the at least one master device requests the fixed length burst of data;

(b) asserting a burst termination signal by the at least one slave device one cycle prior to a last cycle in the fixed length burst based on the value of the signal; and (c) asserting a burst complete signal by the at least one slave device during the last cycle in the fixed length burst for a write burst, or one cycle prior to the last cycle in the fixed length burst for a read burst, based on the value of the signal.

2. The method in claim 1, wherein the maximum length is the maximum number of data transfers for the fixed length burst of data.

3. The method in claim 1, wherein the bus is a PowerPC 4XX Local Bus.

4. The method in claim 1, wherein the signal is a ByteEnable signal.

5. The method in claim 4, wherein the ByteEnable signal indicates a maximum number of transfers requested by the at least one master device.

6. The method in claim 1, wherein no penalty cycles are incurred after a burst transfer of the maximum length.

7. The method in claim 1, wherein the method is optional such that the data processing system may perform an open-ended burst transfer.

8. The method in claim 2, wherein the at least one master or the plurality of slave devices may terminate the fixed length burst of data prior to performing the maximum number of data transfers.

9. A system for providing fixed length bursts of data on a bus within a data processing system; the data processing system including a plurality of master devices coupled to the bus; and a plurality of slave devices coupled to the bus; the system comprising:

means for providing a maximum length information of a fixed length burst of data on a signal from at least one master device to at least one slave device when the at least one master device requests the fixed length burst of data;

means for asserting a burst termination signal by the at least one slave device one cycle prior to a last cycle in the fixed length burst based on the value of the signal; and means for asserting a burst complete signal by the at least one slave device during the last cycle in the fixed length burst for a write burst, or one cycle prior to the last cycle in the fixed length burst for a read burst, based on the value of the signal.

10. The system in claim 9, wherein the maximum length is the maximum number of data transfers for the fixed length burst of data.

11. The system in claim 9, wherein the bus is a PowerPC 4XX Local Bus.

12. The system in claim 9, wherein the signal is a ByteEnable signal.

13. The system in claim 12, wherein the ByteEnable signal indicates a maximum number of transfers requested by the at least one master device.

14. The system in claim 9, wherein no penalty cycles are incurred after a burst transfer of maximum length.

15. The system in claim 9, wherein the method is optional such that the data processing system may perform an open-ended burst transfer.

16. The system in claim 10, wherein the at least one master device or the plurality of slave devices may terminate the fixed length burst of data prior to performing the maximum number of data transfers.

17. A computer readable medium with computer instructions for providing fixed length bursts of data on a data processing system; the data processing system including a plurality of master devices coupled to the bus; and a plurality of slave devices coupled to the bus; the instructions comprising:

(a) instructions for providing a maximum length information of a fixed length burst of data on a signal from at least one master device to at least one slave device when the at least one master device requests the burst of fixed length data;

(b) instructions for asserting a burst termination signal by the at least one slave device one cycle prior to a last cycle in the fixed length burst based on the value of the signal; and (c) instructions for asserting a burst complete signal by the at least one slave device during the last cycle in the fixed length burst for a write burst, or one cycle prior to the last cycle in the fixed length burst for a read burst, based on the value of the signal.

18. A method for providing fixed length bursts of data on a PowerPC 4XX Local Bus within a data processing system; the data processing system including a plurality of master devices coupled to the PowerPC 4XX Local Bus; and a plurality of slave devices coupled to the PowerPC 4XX Local Bus; the method comprising the steps of:

(a) providing a maximum length information of a fixed length burst of data on a ByteEnable signal from at least one master device to at least one slave device when the at least one master device requests the burst of fixed length data;

(b) asserting a burst termination signal by the at least one slave device one cycle prior to a last cycle in the fixed length burst based on the value of the ByteEnable signal; and (c) asserting a burst complete signal by the at least one slave device during the last cycle in the fixed length burst for a write burst, or one cycle prior to the last cycle in the fixed length burst for a read burst, based on the value of the ByteEnable signal.

* * * * *